Sept. 22, 1959     T. HUSTAD     2,905,252
POTATO DIGGER
Filed Nov. 20, 1956

Inventor
Torleif Hustad

United States Patent Office 2,905,252
Patented Sept. 22, 1959

2,905,252

POTATO DIGGER

Torleif Hustad, Sandvollan, Norway

Application November 20, 1956, Serial No. 623,386

3 Claims. (Cl. 171—18)

This invention relates to potato diggers and more particularly to potato diggers of the kind in which potatoes and associated earth are projected upwardly and outwardly to the side of the digger by a throw wheel sweeping upwardly and outwardly across the surface of a conveyor carrying the potatoes. A potato digger of this kind is shown in U.S. patent application, Serial No. 505,989, filed May 14, 1955, now U.S. Patent No. 2,876,849.

In this type of potato diggers, potatoes and earth, dug up by a plowshare are received on a circular conveyor disc the outer edge portion of which is upwardly directed. The conveyor disc rotates in a generally horizontal plane and carries the potatoes and earth to a point remote from the plowshare where they are projected upwardly and to the side of the potato digger by a throw wheel which sweeps across the upwardly directed outer edge of the conveyor. Since the potatoes are less dense than the earth they fall less rapidly than the earth and land on top of the earth. This separation facilitates the recovery of the potatoes since they may be collected without further separation from associated earth. The operation of this type of potato diggers causes the potatoes and earth to fall in rows behind and to one side of the digger as it moves along.

The object of the present invention is to improve the operation of this type of digger by improving the cooperation between the throw wheel and the circular conveyor disc. This object is accomplished by the use of a pronged throw wheel, a circular conveyor having an inner central hub or solid disc member and spokes or bars secured thereto while extending outwardly in an upwardly inclined direction. The pronged throw wheel is arranged relatively to the conveyor so that the prongs engage between the spokes of the conveyor as they sweep across the conveyor.

A potato digger constructed in accordance with this invention will be described with reference to the drawing, in which.

Figure 1:
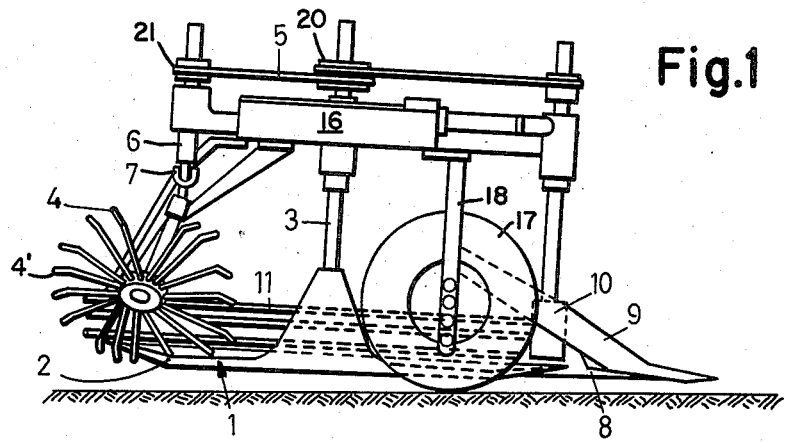
Fig. 1 is a substantially diagrammatical side view of the potato digger.
Figure 2:
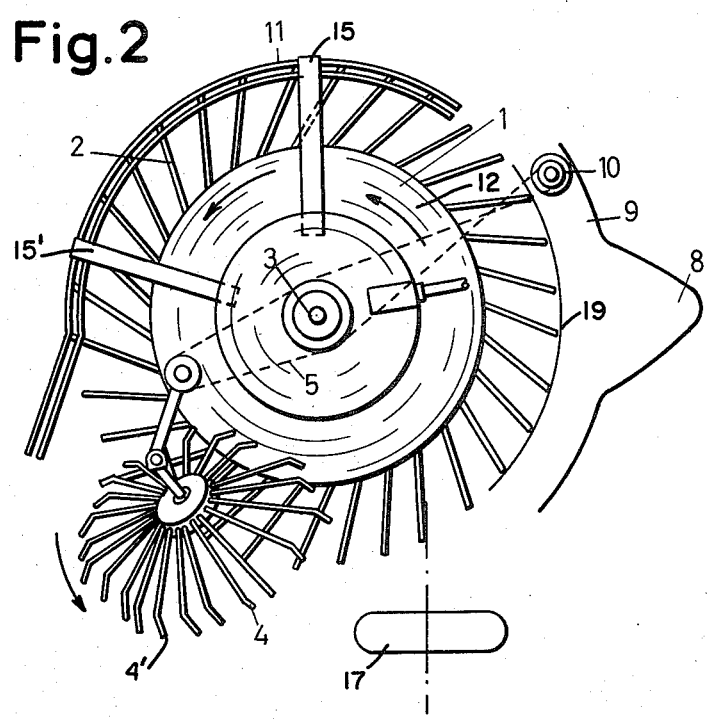
Fig. 2 is a substantially diagrammatic plan view of a potato digger with a modified positioning of the throw wheel.

The rotatable circular conveyor for carrying potatoes and associated earth designated generally at 1, is constructed of a central hub or disc member 12 and angularly spaced spokes 2 extending upwardly and outwardly from the central disc member. The spokes may be integral with the central disc member or secured thereto by any suitable means. For the sake of clarity, only one-half of the actual number of spokes are shown in Fig. 2. The conveyor is carried on a shaft 3 which is rotatably mounted in the frame 16, and the conveyor is turned by the rotation of shaft 3 by any suitable mechanism which may be driven by the power output from a tractor. As a safety measure, a guard 11 is provided generally about the exposed edges of the circular conveyor. The guard is carried by rods 15.

A pronged throw wheel 4, having prongs 4', is mounted above the conveyor 1 at the rear of the potato digger and in a position such that the prongs of the throw wheel engage between the spokes of the conveyor 1 when the pronged throw wheel 4 is rotated. The throw wheel is preferably placed to one side of the center of the throw wheel and the conveyor is turned so as to move toward that side at the rear of the digger so that the potatoes received on the conveyor at the front of the digger will be carried over more than one-half of the circular orbit of the conveyor before they reach the pronged throw wheel 4. Thus, in Fig. 2, potatoes received at 19 are conveyed through approximately five-eighths of the orbit of the counterclockwise moving conveyor wheel before they reach the throw wheel.

The throw wheel is driven to sweep outwardly across the spokes 2 of the circular conveyer by shaft 6, provided with a universal joint 7. Shaft 6, rotatably mounted in frame 16, is powered by chains 5 which in turn pass around wheels 20 and 21 on shafts 3 and 6 respectively. The rotation of shaft 3 to turn the circular conveyer 1 thus operates the pronged throw wheel 4. Of course the relative circumferential speeds of the throw wheel and the circular conveyer can easily be calculated so that the prongs and spokes pass free of each other and do not lock each other.

The plowshare 8, carried by the forward portion of the frame 16 is positioned so that potatoes and associated earth removed from the ground by the share will fall onto the spokes 2 of the circular conveyer at 19. The plowshare has a guard 9 which is cleansed of earth by a rotatable scraper 10. 10 is a rotatable scraper adapted to remove the earth from the guard.

The frame 16 stands on the ground and moves along on wheels 17 suspended from the frame by legs 18.

In operation the digger is drawn along in a forwardly inclined position so that the plowshare will dig up potatoes and associated earth. The earth dug up by the share 8 together with the potatoes, due to the forwardly inclined position of the apparatus, is conveyed onto the rotating circular conveyer. The mass is brought entirely up from the ground and onto the circular conveyer 1 before it can encounter the throw wheel 4. By the disposition of the rotating circular conveyer 1 and the throw wheel 4 relatively to each other, as shown, and their direction of rotation, the mass of earth and potatoes is conveyed against the throw wheel 4 from behind, and is thrown up in the air by said wheel, and because the earth is more dense than the potatoes, the earth falls first and the potatoes are left on top of the earth. In this way the potatoes are not covered with earth and can easily be picked up.

Due to the fact that the throw wheel 4 is inclined relatively to the rotatable circular conveyer 1, the mass of earth and potatoes is thrown out in an inclined direction relatively to the direction of the movement of the apparatus.

The improvement of the shape of disk according to the invention as compared with a solid disk according to the known construction, is that the throw wheel more effectively separates potatoes and earth and more effectively throws the potatoes out in the way described. This improved effect is obtained thereby that the prongs of the throw wheel instead of sweeping with their ends against the surface of a solid disk, will engage between the spokes 2 of the disk 1 according to the invention.

The apparatus can also work with a good effect in wet earth due to the fact that the mass is lifted up from the ground before being thrown out.

I claim:

1. A digger for potatoes and the like comprising a frame, a share, means mounting the share at the front of said frame, a conveyor comprising a central disk member and spokes directed outwardly and upwardly from said disk, means rotatably mounting said conveyor on said frame for rotation about a generally upright forwardly inclined axis and in a position to receive potatoes and associated earth from said share and convey them to a position remote from said share, a throw wheel comprising a hub and outwardly directed spokes, means rotatably mounting said throw wheel on said frame over a portion of said conveyor remote from said share and in a position for said throw wheel spokes to interdigitate with said conveyor spokes and means rotating said conveyor and said throw wheel in synchronism so that the spokes of said throw wheel may sweep between the spokes of said conveyor without touching them, whereby potatoes and associated earth dug by the share will be conveyed rearwardly and above the level of the earth by the rotation of the conveyor and swept upwardly and outwardly from the spoked conveyor by the throw wheel.

2. A potato digger as claimed in claim 1, in which the throw wheel is located above the portion of the conveyer wheel lying generally opposite the share and in the part of said portion which lies on the side of a vertical plane drawn through said share and the axis of rotation of said conveyer which is in the direction of movement of said conveyor while in said portion whereby potatoes received on the conveyer wheel from the plowshare will travel more than one-half the orbit of rotation of the conveyer before engaging the throw wheel.

3. A potato digger as claimed in claim 1, in which the axis of rotation of the throw wheel is inclined downwardly in the direction of rotation of the circular conveyer.

References Cited in the file of this patent

FOREIGN PATENTS

| | | |
|---|---|---|
| 88,983 | Germany | Oct. 30, 1896 |
| 519,239 | Germany | Feb. 25, 1931 |
| 640,165 | Great Britain | July 12, 1950 |
| 85,854 | Norway | Aug. 15, 1955 |
| 1,108,814 | France | Sept. 14, 1955 |